US010787099B2

(12) United States Patent
Sugiyama

(10) Patent No.: US 10,787,099 B2
(45) Date of Patent: Sep. 29, 2020

(54) SEAT APPARATUS

(71) Applicant: TS TECH CO., LTD., Asaka-shi, Saitama (JP)

(72) Inventor: Shinji Sugiyama, Shioya-gun (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 16/376,707

(22) Filed: Apr. 5, 2019

(65) Prior Publication Data
US 2019/0232820 A1 Aug. 1, 2019

Related U.S. Application Data

(63) Continuation of application No. 15/833,694, filed on Dec. 6, 2017, now Pat. No. 10,293,710, which is a (Continued)

(30) Foreign Application Priority Data

Aug. 31, 2011 (JP) ................. 2011-188478
Aug. 31, 2011 (JP) ................. 2011-188482

(51) Int. Cl.
*B60N 2/02* (2006.01)
*B60N 2/68* (2006.01)
(Continued)

(52) U.S. Cl.
CPC ............ *B60N 2/0244* (2013.01); *A47C 9/002* (2013.01); *B60N 2/02* (2013.01); *B60N 2/20* (2013.01);
(Continued)

(58) Field of Classification Search
CPC ... B60N 2/02; B60N 2/68; B60N 2/44; B60N 2/4228; B60N 2/42709; B60N 2/667
(Continued)

(56) References Cited

U.S. PATENT DOCUMENTS 5,975,633 A * 11/1999 Walk ................. B60N 2/42727
297/284.9
6,910,736 B2 6/2005 White
(Continued)

FOREIGN PATENT DOCUMENTS

CN 101186190 A 5/2008
JP 2007-314163 A 12/2007
(Continued)

OTHER PUBLICATIONS

Jan. 28, 2015 Search Report issued in European Application No. 12828680.4.
(Continued)

*Primary Examiner* — Syed A Islam
(74) *Attorney, Agent, or Firm* — Oliff PLC

(57) ABSTRACT

In order to improve steering operation operability during cornering while maintaining a driver holding property, a seat apparatus is provided with: a seat back frame; a cornering sensor for detecting a cornering direction of a vehicle; and a control unit that controls the seat back frame on the basis of the result of detection by the cornering sensor. The seat back frame is provided with: left and right side frames disposed on both sides of the seat back frame; a back plate disposed between the left and right side frames; and a swinging mechanism for swinging the back plate with respect to the direction of movement of the vehicle. The control unit controls the swinging mechanism such that, upon detection of a cornering direction of the vehicle by the cornering sensor, the inner one of the sides of the back plate with respect to the cornering direction is positioned rearward of the outer one of the sides with respect to the cornering direction.

12 Claims, 9 Drawing Sheets

Related U.S. Application Data continuation of application No. 15/010,446, filed on Jan. 29, 2016, now Pat. No. 9,868,366, which is a continuation of application No. 14/241,293, filed as application No. PCT/JP2012/071766 on Aug. 29, 2012, now Pat. No. 9,283,868.

(51) Int. Cl.
| | | |
|---|---|---|
| *A47C 9/00* | (2006.01) | |
| *B60N 2/90* | (2018.01) | |
| *B60N 2/20* | (2006.01) | |
| *B60N 2/42* | (2006.01) | |
| *B60N 2/427* | (2006.01) | |
| *B60N 2/66* | (2006.01) | |

(52) U.S. Cl.
CPC ............ *B60N 2/68* (2013.01); *B60N 2/90* (2018.02); *B60N 2/4228* (2013.01); *B60N 2/42709* (2013.01); *B60N 2/667* (2015.04); *B60N 2002/024* (2013.01); *B60N 2002/026* (2013.01); *B60N 2002/0212* (2013.01); *B60N 2002/0236* (2013.01); *B60N 2002/0268* (2013.01)

(58) Field of Classification Search
USPC ...... 701/49; 297/383, 284.9, 452.34, 216.13, 297/216.14, 314
See application file for complete search history.

(56) References Cited

U.S. PATENT DOCUMENTS

| | | | |
|---|---|---|---|
| 7,140,681 B2 | 11/2006 | McMillen | |
| 7,731,280 B2* | 6/2010 | Niitsuma | B60N 2/838 297/216.12 |
| 7,987,032 B2 | 7/2011 | Uenuma et al. | |
| 8,632,126 B2* | 1/2014 | Nitsuma | B60N 2/4228 297/216.13 |
| 8,886,413 B2* | 11/2014 | Hozumi | B60N 2/0244 701/49 |
| 2007/0203628 A1 | 8/2007 | Yoshida et al. | |
| 2008/0119997 A1 | 5/2008 | Hozumi et al. | |
| 2008/0154460 A1 | 6/2008 | Uenuma et al. | |
| 2010/0164270 A1 | 7/2010 | Akutsu | |

FOREIGN PATENT DOCUMENTS

| | | |
|---|---|---|
| JP | 2008-049837 A | 3/2008 |
| JP | 2010-006184 A | 1/2010 |
| JP | 2010-260486 A | 11/2010 |
| WO | 2006/076898 A2 | 7/2006 |

OTHER PUBLICATIONS

Jul. 14, 2015 Office Action issued in Japanese Patent Application No. 2011-188482.
Jul. 27, 2015 Office Action issued in Chinese Patent Application No. 201280042507.2.
Sep. 25, 2012 International Search Report issued in International Patent Application No. PCT/JP2012/071766.
Aug. 2, 2017 Office Action issued in Chinese Patent Application No. 201610229702.6.
Nov. 12, 2018 Search Report issued in European Patent Application No. 18176141.2.

* cited by examiner

Annotated Fig.1

FIG.7
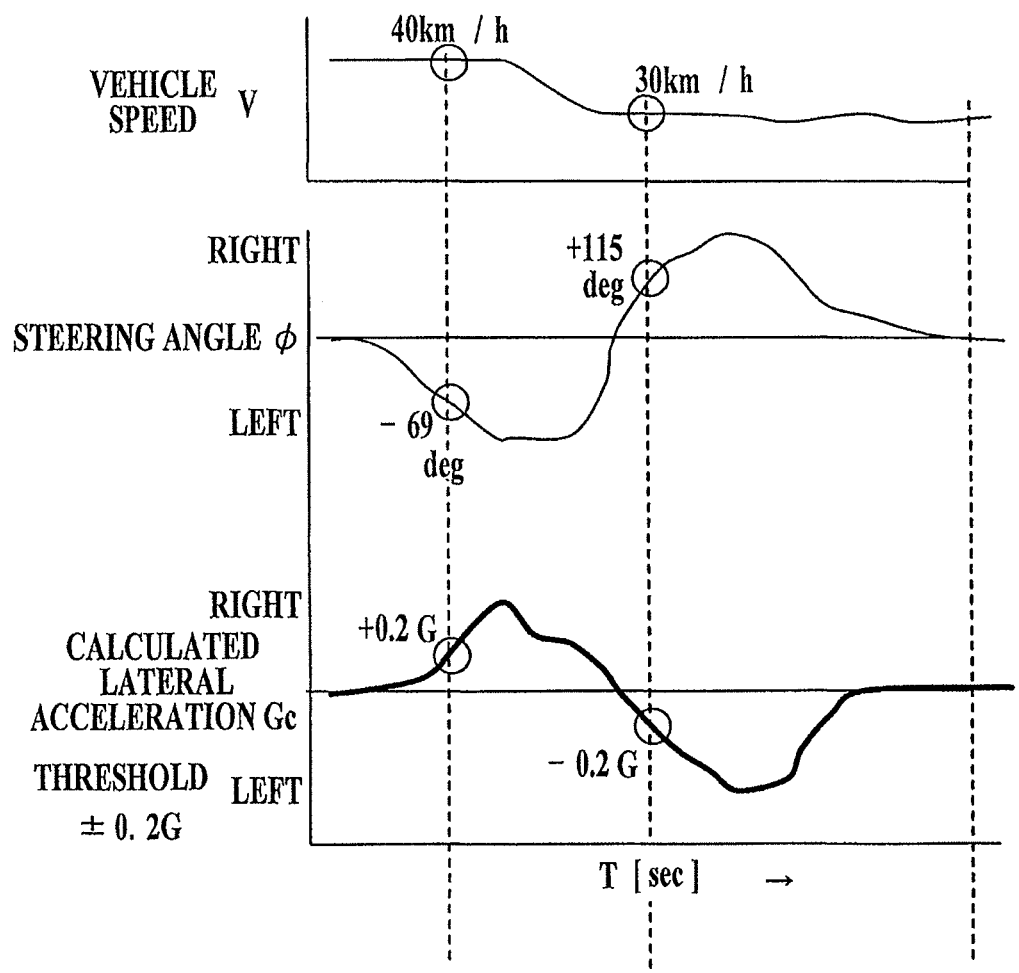
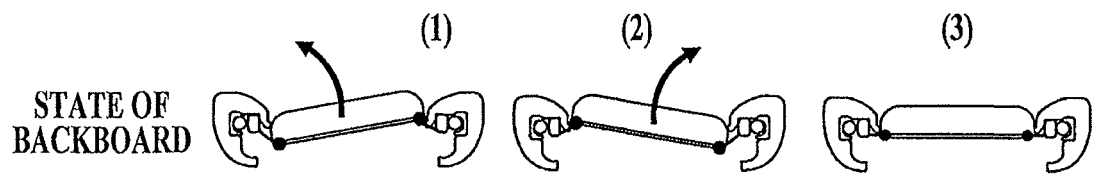

SEAT APPARATUS

This application is a continuation application of application Ser. No. 15/833,694 filed Dec. 6, 2017, which in turn is a continuation application of application Ser. No. 15/010,446 filed Jan. 29, 2016 (now U.S. Pat. No. 9,868,366), which in turn is a continuation application of application Ser. No. 14/241,293 filed Feb. 26, 2014 (now U.S. Pat. No. 9,283,868), which in turn is a U.S. national stage of Application No. PCT/JP2012/071766 filed Aug. 29, 2012, which claims priority to Japanese Application Nos. 2011-188478 filed Aug. 31, 2011 and 2011-188482 filed Aug. 31, 2011. The entire disclosures of each of the prior applications are incorporated herein by reference.

TECHNICAL FIELD

The present invention relates to a seat apparatus, and particularly relates to a seat apparatus to be mounted on a vehicle.

BACKGROUND ART

Conventionally, among seat apparatuses to be mounted on vehicles such as automobiles, there is known a seat apparatus which reduces the load a driver feels by moving the side support frames provided with the seat apparatus according to the cornering and holding the driver to the seat apparatus in order to ensure safety in controlling when the vehicle performs cornering (for example, see patent document 1).

PRIOR ART DOCUMENTS

Patent Documents

Patent Document 1: Japanese Patent Application Laid Open Publication No. 2007-314163

DISCLOSURE OF THE INVENTION

Problems to be Solved by the Invention

Although holding ability improves when the side support frames are moved, pressure to shoulders due to steering operation is not relieved and there may be a feeling of strangeness during operation.

In view of this, an object of the present invention is to improve operability of steering operation while maintaining driver holding ability at the time of cornering.

Means for Solving the Problem

In order to solve the above problems, embodiments of the invention are directed to a seat apparatus to be mounted on a vehicle including a seat cushion frame, a seat back frame which is arranged so as to stand from a back end part of the seat cushion frame, a cornering sensor which detects a cornering direction of the vehicle and a control unit which controls the seat back frame on a basis of a detection result obtained by the cornering sensor, wherein the seat back frame includes left and right side frames which are respectively arranged at two side parts of the seat back frame so as to extend in a vertical direction, a backboard which is arranged between the left and right side frames, and a swing mechanism which swings the backboard with respect to a traveling direction of the vehicle, and wherein the control unit controls the swing mechanism so that, among two side parts of the backboard, a side part which is inside with respect to the cornering direction be located at back comparing to a side part which is outside with respect to the cornering direction when the cornering direction of the vehicle is detected by the cornering sensor.

In embodiments, the control unit controls the swing mechanism so that, among the two side parts of the backboard, the side part which is inside with respect to the cornering direction move backward from a reference position and so that the side part which is outside with respect to the cornering direction move frontward from the reference position when the cornering direction of the vehicle is detected by the cornering sensor.

In embodiments, the swing mechanism includes a first connection unit which connects one of the left and right side frames and one side part of the backboard, a first drive source which swings the one side part of the backboard in the front-back direction by moving the first connection unit, a second connection unit which connects the other of the left and right side frames and the other side part of the backboard; and a second drive source which swings the other side part of the backboard by moving the second connection unit, and wherein the control unit controls the swing mechanism by controlling at least one of the first drive source and the second drive source.

In embodiments, the first connection unit is provided with a single link unit which swings one side part of the backboard by being rotated by the first drive source, and the second connection unit is provided with a single link unit which swings the other side part of the backboard by being rotated by the second drive source.

In embodiments, the cornering sensor is a steering angle sensor which detects a steering angle of a steering of the vehicle.

In embodiments, the cornering sensor is a navigation system installed in the vehicle.

In embodiments, a vehicle speed sensor which detects a speed of the vehicle, wherein the control unit adjusts a posture of a driver by controlling the swing mechanism to swing the backboard when a calculated lateral acceleration is a predetermined value or greater, the calculated lateral acceleration being calculated from a detection result obtained by the cornering sensor and a detection result obtained by the vehicle speed sensor.

In embodiments, a seat cushion frame, a seat back frame which is arranged so as to stand from a back end part of the seat cushion frame, a cornering sensor which detects a cornering direction of the vehicle, a vehicle speed sensor which detects a speed of the vehicle and a control unit which controls the seat back frame on a basis of a detection result obtained by the cornering sensor and a detection result obtained by the vehicle speed sensor, wherein the seat back frame includes left and right side frames which are respectively arranged at two side parts of the seat back frame so as to extend in a vertical direction and an adjustment mechanism which engages with the left and right side frames and which adjusts a posture of a driver, and wherein the control unit controls the adjustment mechanism to adjust the posture of the driver when a calculated lateral acceleration is a predetermined value or greater, the calculated lateral acceleration being calculated from the detection result obtained by the cornering sensor and the detection result obtained by the vehicle speed sensor.

Effect of the Invention

In embodiments, when the cornering direction of a vehicle is detected by the cornering sensor, among the two side parts of the backboard, the side part which is inside with respect to the cornering direction is positioned at the back than the side part which is outside with respect to the cornering direction. Therefore, the posture of the driver can be tilted inward with respect to the cornering direction. Since pressure to the shoulder is small in such case where the driver is held by the backboard comparing to a conventional case where the driver is held by moving the side support frames, operability of steering operation can be improved while maintaining the driver holding ability at the time of cornering.

In embodiments, when the cornering direction of a vehicle is detected by the cornering sensor, among the two side parts of the backboard, the side part which is inside with respect to the cornering direction moves backward from the reference position and the side part which is outside with respect to the cornering direction moves frontward from the reference position. Therefore, the backboard can be tilted inside with respect to the cornering direction even more. Thus, the holding ability at the time of cornering can be improved.

In embodiments, the swing mechanism includes a first connection unit which connects one of the left and right side frames and one side part of the backboard, a first drive source which swings the one side part of the backboard in the front-back direction by moving the first connection unit, a second connection unit which connects the other of the left and right side frames and the other side part of the backboard and a second drive source which swings the other side part of the backboard by moving the second connection unit. Therefore, in the backboard, one side portion and the other side portion thereof can be controlled independently.

In embodiments, since the cornering sensor is a steering angle sensor which detects the steering angle of the steering of the vehicle, the backboard can be moved in conjunction with the steering operation.

In embodiments, since the cornering sensor is a navigation system, the backboard can be moved in conjunction with the actual traveling path.

In embodiments, the backboard swings to adjust the posture of the driver when the calculated lateral acceleration be a predetermined value or greater, the calculated lateral acceleration being calculated from the detection result obtained by the cornering sensor and the detection result obtained by the vehicle speed sensor. Therefore, the state of the vehicle can be recognized by monitoring the calculated lateral acceleration and the holding ability of the seat apparatus can vary according to the state.

Here, since the measured lateral acceleration which is obtained by measuring the actual lateral acceleration to a vehicle on real-time basis is sensitive to the influence of steering correction, slipping on a road and the like, the backboard moves frequently when the backboard is controlled on the basis of the detection result of the measured lateral acceleration and a load is put on the driver. On the other hand, since calculated lateral acceleration can control the above influences, the backboard does not move frequently and the load to the driver can also be reduced.

Even if calculated lateral acceleration is used in place of measured lateral acceleration as described above, the holding ability of the seat apparatus can be varied according to the state of the vehicle.

In embodiments, the adjustment mechanism operates and the posture of the driver is adjusted when the calculated lateral acceleration be a predetermined value or greater, the calculated lateral acceleration being calculated from the detection result obtained by the cornering sensor and the detection result obtained by the vehicle speed sensor. Therefore, while recognizing the state of the vehicle by monitoring the calculated lateral acceleration, the holding ability of the seat apparatus can be varied according to the state.

Here, since the measured lateral acceleration which is obtained by measuring the actual lateral acceleration of a vehicle on real-time basis is sensitive to the influence of steering correction, slipping on a road and the like, the backboard moves frequently when the backboard is controlled on the basis of the detection result of the measured lateral acceleration and a load is put on the driver. On the other hand, since calculated lateral acceleration can control the above influences, the backboard does not move frequently and the load to the driver can also be reduced.

Even if calculated lateral acceleration is used in place of measured lateral acceleration as described above, the holding ability of the seat apparatus can be varied according to the state of the vehicle.

BRIEF DESCRIPTION OF DRAWINGS

FIG. 7 is an explanatory drawing showing vehicle speed, calculated lateral acceleration and state of backboard while a vehicle travels as shown in FIG. 6.

BEST MODE FOR CARRYING OUT THE INVENTION

Figure 1:
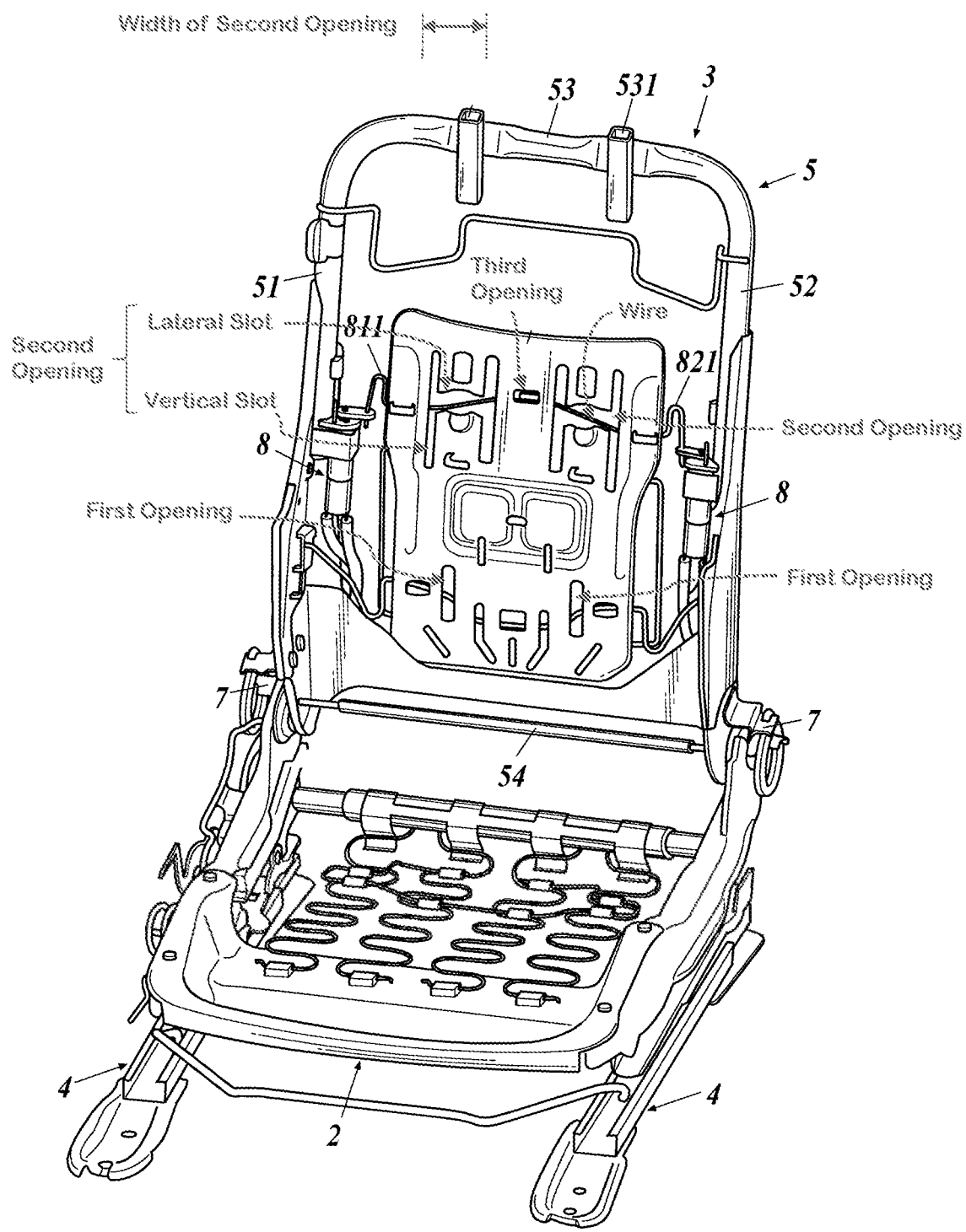
FIG. 1 is an overall schematic view showing a frame configuration of a seat apparatus according to the present invention.

Hereinafter, an embodiment for carrying out the present invention will be described by using the drawings. Although various limitations that are technically preferred in order to carry out the present invention are included in the embodiment described below, the scope of the invention is not limited to the following embodiment and examples shown in the drawings in any way.

FIG. 1 is an overall schematic view showing a frame configuration of a seat apparatus. As shown in FIG. 1, the seat apparatus 1 includes a seat cushion frame 2, a seat back frame 3 which is attached to the back end part of the seat cushion frame 2 and seat rails 4 which support the seat cushion frame 2 so as to slide freely.

The seat back frame 3 supports a seat pad which is not shown in the drawing. The seat back frame 3 includes a frame main body 5, a backboard 6 which is disposed inside the frame main body 5, a pair of connectors 7 where the connectors 7 are respectively fixed at lower left and right ends of the frame main body 5 and a swing mechanism 8 which makes the backboard 6 swing with respect to the traveling direction of a vehicle.

The frame main body 5 includes a pair of right and left side frames 51 and 52 which extend in the vertical direction, an upper frame 53 which extend between upper end parts of the side frames 51 and 52 which form a pair and a lower frame 54 which extend between lower end parts of the side frames 51 and 52 which form a pair.

The side frames 51 and 52 are parallel to each other and extend in the vertical direction.

At the lower end parts of the left and right side frames 51 and 52, the connectors 7 are respectively fixed. The connectors 7 are connected to the seat cushion frame 2 so as to rotate freely.

The upper frame 53 is formed continuously from the side frames 51 and 52 which form a pair. At the upper frame 53, a head rest supporting unit 531 for detachably supporting a head rest, which is not shown in the drawing, is provided.

The backboard 6 is a board member shaped in an approximately rectangular shape when seen from the front and is disposed between the side frames 51 and 52 which form a pair. The backboard 6 supports the back of a driver via a seat pad which is not shown in the drawing.

The swing mechanism 8 includes a first connection unit 81, a first drive source 82, a second connection unit 83 and a second drive source 84.

Figure 2:
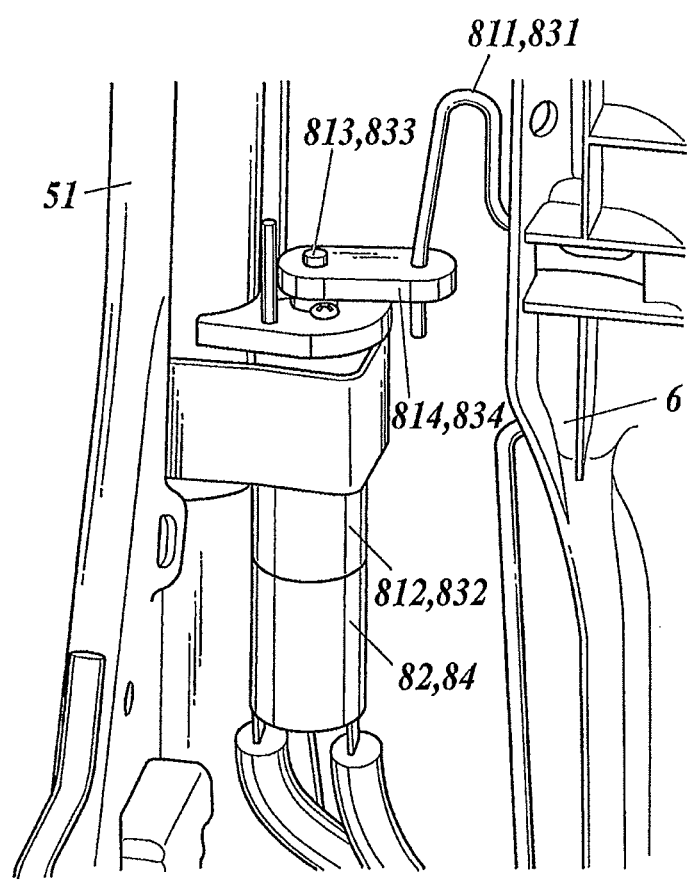
FIG. 2 is a schematic view showing a rough configuration of the first connection unit and the first drive source provided with the seat apparatus shown in FIG. 1.

FIG. 2 is a schematic view showing a rough configuration of the first connection unit 81 and the first drive source 82. Here, the specific configurations of the second connection unit 83 and the second drive source 84 are the same as those of the first connection unit 81 and the first drive source 82. Therefore, reference numerals whose first two digits are different such as "81*" and "83*" are used for the corresponding parts and their description is omitted.

The first connection unit 81 includes a wire unit 811 which extends toward outside from one side of the backboard 6, a gear unit 812 which is fixed to the side frame 51 which is one of the pair of side frames 51 and 52, and a link unit 814 which rotates centering around the rotary shaft 813 of the gear unit 812 and which makes the wire unit 811 swing in the front-back direction.

The first drive source 82 is connected to the gear unit 812 and rotates the rotary shaft 813 of the gear unit 812. Thereby, the link unit 814 rotates and the wire unit 811 swings in the front-back direction, and one side part of the backboard 6 also swings in the same direction.

The swing mechanism 8 and the backboard 6 are an adjustment mechanism for adjusting the posture of a driver according to the present invention.

Figure 3:
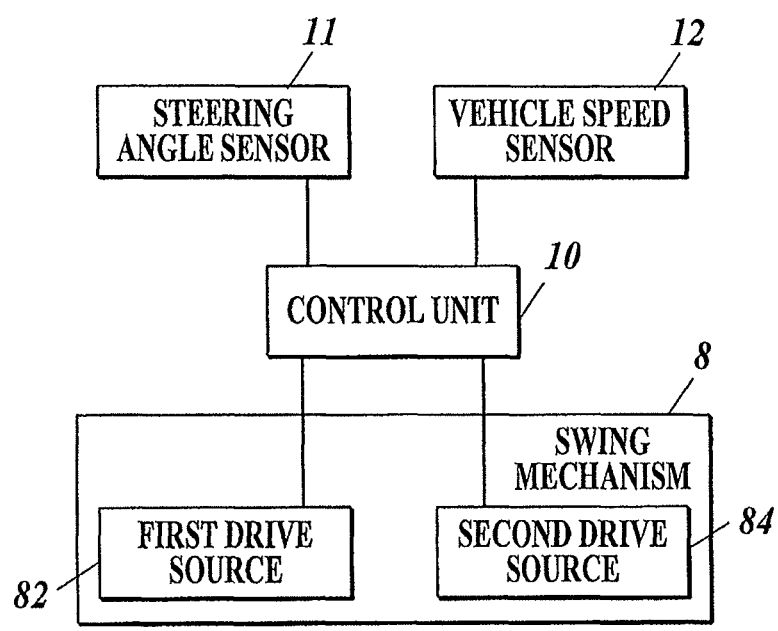
FIG. 3 is a block diagram showing a main control configuration of the seat apparatus shown in FIG. 1.

FIG. 3 is a block diagram showing a main control configuration of the seat apparatus of the embodiment. As shown in FIG. 3, the steering angle sensor 11 which detects steering angle of the steering of a vehicle, the vehicle speed sensor 12 which detects the speed of a vehicle, the first drive source 82 and the second drive source 84 are electrically connected to the control unit 10 of the seat apparatus 1. The control unit 10 controls the first drive source 82 and the second drive source 84 on the basis of the detection result obtained by the steering angle sensor 11 and the detection result obtained by the vehicle speed sensor 12.

Hereinafter, the posture controlling of the backboard 6 performed by the control unit 10 will be described in detail.

If the vehicle 100 curves at a speed V and the steering angle at that time is ϕ, cornering radius R is calculated by formula (1) shown below. Calculated lateral acceleration Gc is calculated by formula (2) shown below. Here, "A" represents the stability factor and is a coefficient unique to a vehicle. Further, "L" represents a length of a wheel base of the vehicle 100.

$$R=(1+AV^2)/(L/\phi) \qquad (1)$$

$$Gc=V^2/R \qquad (2)$$

The control unit 10 applies the detection result obtained by the steering angle sensor 11 and the detection result obtained by the vehicle speed sensor sequentially to formula (1) and formula (2) to obtain the cornering radius R and the calculated lateral acceleration Gc on a real-time basis. If the steering angle is positive, the cornering is to the right and the calculated lateral acceleration acts on to the left. On the other hand, if the steering angle is negative, the cornering is to the left and the calculated lateral acceleration acts on to the right. If the steering angle becomes larger, the calculated lateral acceleration becomes greater. Further, if the vehicle speed becomes faster, the calculated lateral acceleration becomes greater. If the calculated lateral acceleration reaches a predetermined value or greater, the control unit 10 executes posture control of the backboard 6.

As for the predetermined value, −0.2 G or smaller is set for when cornering to the right and +0.2 G or greater is set for when cornering to the left, for example. If the calculated lateral acceleration is −0.2 G or smaller or 0.2 G or greater, the lateral acceleration becomes a burden to a driver in general. Therefore, these values are set as thresholds.

Figure 4:
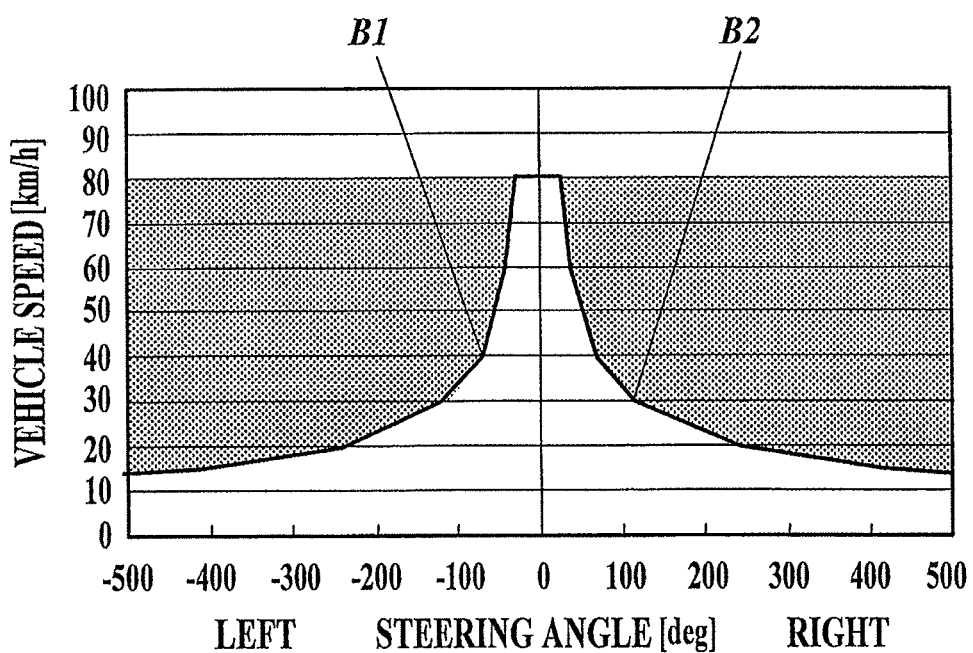
FIG. 4 is a graph showing a relation between vehicle speed and steering angle in a case where the threshold of calculated lateral acceleration is −0.2 G or greater and 0.2 or smaller.

FIG. 4 is a graph showing a relation between vehicle speed and steering angle in a case where the thresholds of the calculated lateral acceleration is set to −0.2 G or greater and 0.2 G or smaller. In a case where the vehicle speed is at 40 km and the steering angle to the left is 69 deg (B1 in FIG. 4) or the vehicle speed is at 30 km and the steering angle to the right is 115 deg (B2 in FIG. 4) where the detection result obtained by the steering angle sensor 11 and the detection result obtained by the vehicle speed sensor are in the shaded regions shown in FIG. 4, the control unit 10 determines that the calculated lateral acceleration exceeded the thresholds and executes the posture controlling of the backboard 6.

Figure 5:
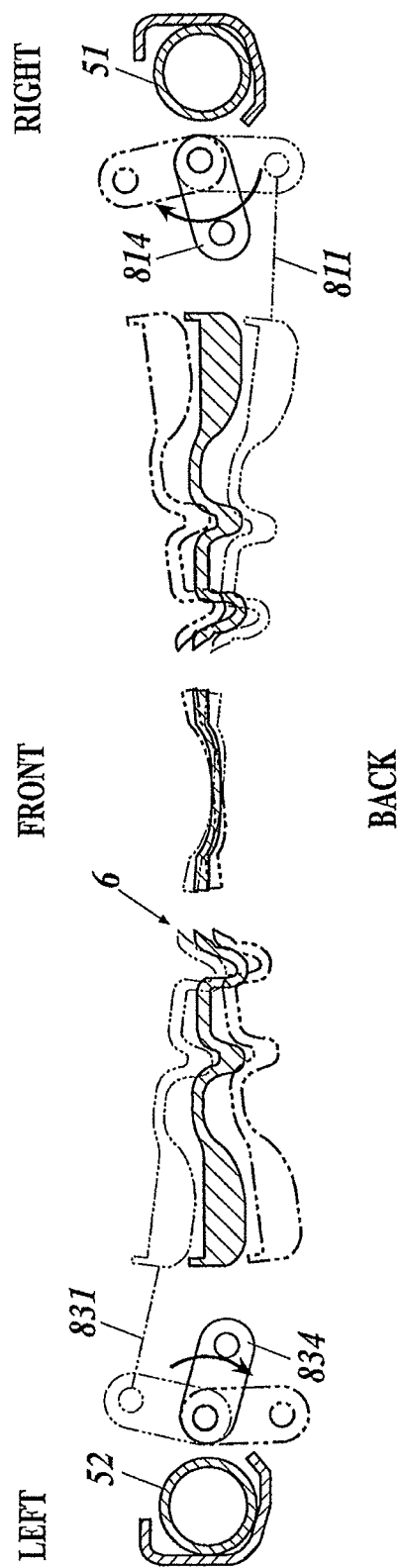
FIG. 5 is an explanatory drawing showing a posture of a backboard provided with the seat apparatus shown in FIG. 1.

The controlling performed by the control unit 10 at the time of posture controlling of the backboard 6 will be described. FIG. 5 is an explanatory drawing showing a posture of the backboard 6. Here, the solid lines in FIG. 5 show the state where the backboard 6 is not swinging and this position is the reference position.

If the cornering exceeding the threshold is to the right, the control unit 10 controls the first drive source 82 and the second drive source 84 so as to move, among the two side parts of the backboard 6, the side part which is inside with respect to the cornering direction (the right side part facing the traveling direction) toward back from the reference position and move the side part which is outside with respect to the cornering direction (the left side part facing the traveling direction) toward front from the reference position (see narrow two-dot chain lines in FIG. 5).

On the other hand, if the cornering exceeding the threshold is to the left, the control unit 10 controls the first drive source 82 and the second drive source 84 so as to move, among the two side parts of the backboard 6, the side part which is inside with respect to the cornering direction (the left side part facing the traveling direction) toward back from the reference position and move the side part which is outside with respect to the cornering direction (the right side part facing the traveling direction) toward front from the reference position (see bold two-dot chain lines in FIG. 5).

Figure 6:
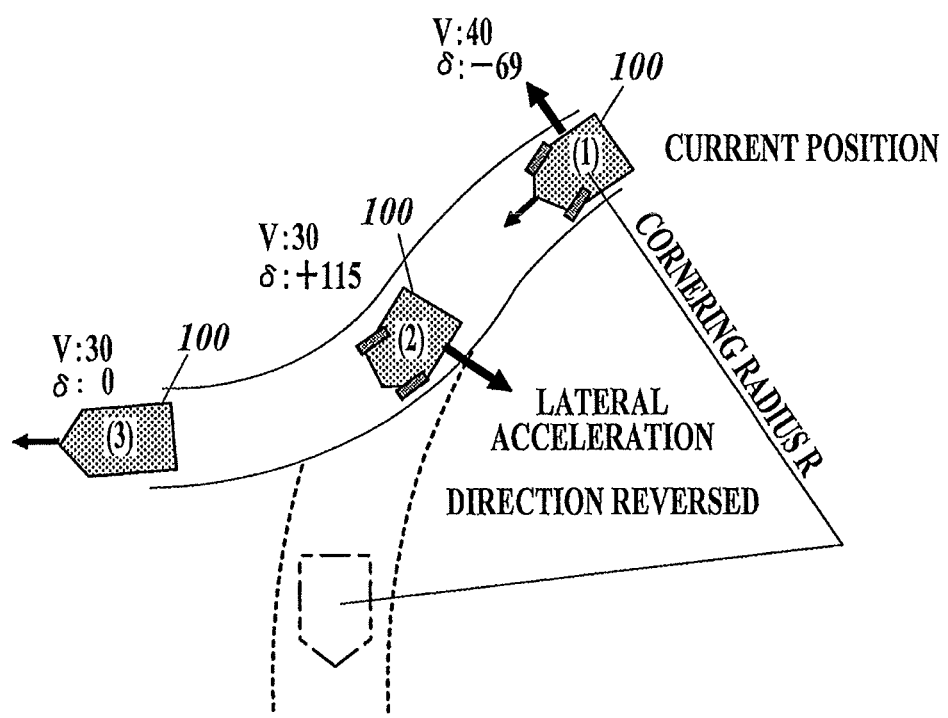
FIG. 6 is an explanatory drawing showing a path on which a vehicle that was traveling straight corners to the left, corners to the right just after cornering to the left and then travels straight again.

Next, operation of the embodiment will be described. FIG. 6 is an explanatory drawing showing a path on which a vehicle that was traveling straight corners to the left, corners to the right just after cornering to the left and then travels straight again. FIG. 7 is an explanatory drawing showing vehicle speed, calculated lateral acceleration and state of backboard while a vehicle travels as shown in FIG. 6.

First, when traveling straight, the control unit 10 controls the first drive source 82 and the second drive source 84 so that the backboard 6 be at the reference position.

Then, the steering is operated and the vehicle 100 starts cornering to the left. While traveling, the control unit 10 monitors the detection result obtained by the steering angle sensor 11 and the detection result obtained by the vehicle speed sensor at all times and sequentially calculates the calculated lateral acceleration. For example, at point (1) shown in FIG. 6 and FIG. 7, if the vehicle speed is 40 km, the steering angle to the left is 69 deg and the calculated lateral acceleration exceeds 0.2 G, at this point, the control unit 10 determines that the calculated lateral acceleration exceeded the threshold and controls the first drive source 82 and the second drive source 84 so as to move, among the two side parts of the backboard 6, the side part which is inside with respect to the cornering direction toward back from the reference position and move the side part which is outside with respect to the cornering direction toward front from the reference position (see the state of the backboard shown in (1) of FIG. 7).

Thereafter, the steering is operated in the opposite direction and the vehicle 100 corners to the right. At point (2) shown in FIG. 6 and FIG. 7, if the vehicle speed is at 30 km, the steering angle to the right is 115 deg and the calculated lateral acceleration is smaller than −0.2 G, at this point, the control unit 10 determines that the calculated lateral acceleration exceeded the threshold and controls the first drive source 82 and the second drive source 84 so as to move, among the two side parts of the backboard 6, the side part which is inside with respect to the cornering direction toward back from the reference position and move the side part which is outside with respect to the cornering direction toward front from the reference position (see the state of the backboard shown in (2) of FIG. 7).

Then, when the steering is operated and the vehicle 100 travels straight, the calculated lateral acceleration becomes smaller than the threshold. Therefore, the control unit 10 controls the first drive source 82 and the second drive source 84 so that the two side parts of the backboard 6 be at the reference position (see the state of the backboard shown in (3) of FIG. 7).

As described above, according to the embodiment, when the cornering direction of the vehicle 100 is detected by the steering angle sensor 11, among the two side parts of the backboard 6, the side part which is inside with respect to the cornering direction moves toward back from the reference position and the side part which is outside with respect to the cornering direction moves toward front from the reference position. Therefore, the backboard 6 can be tilted inside with respect to the cornering direction.

Figure 8:
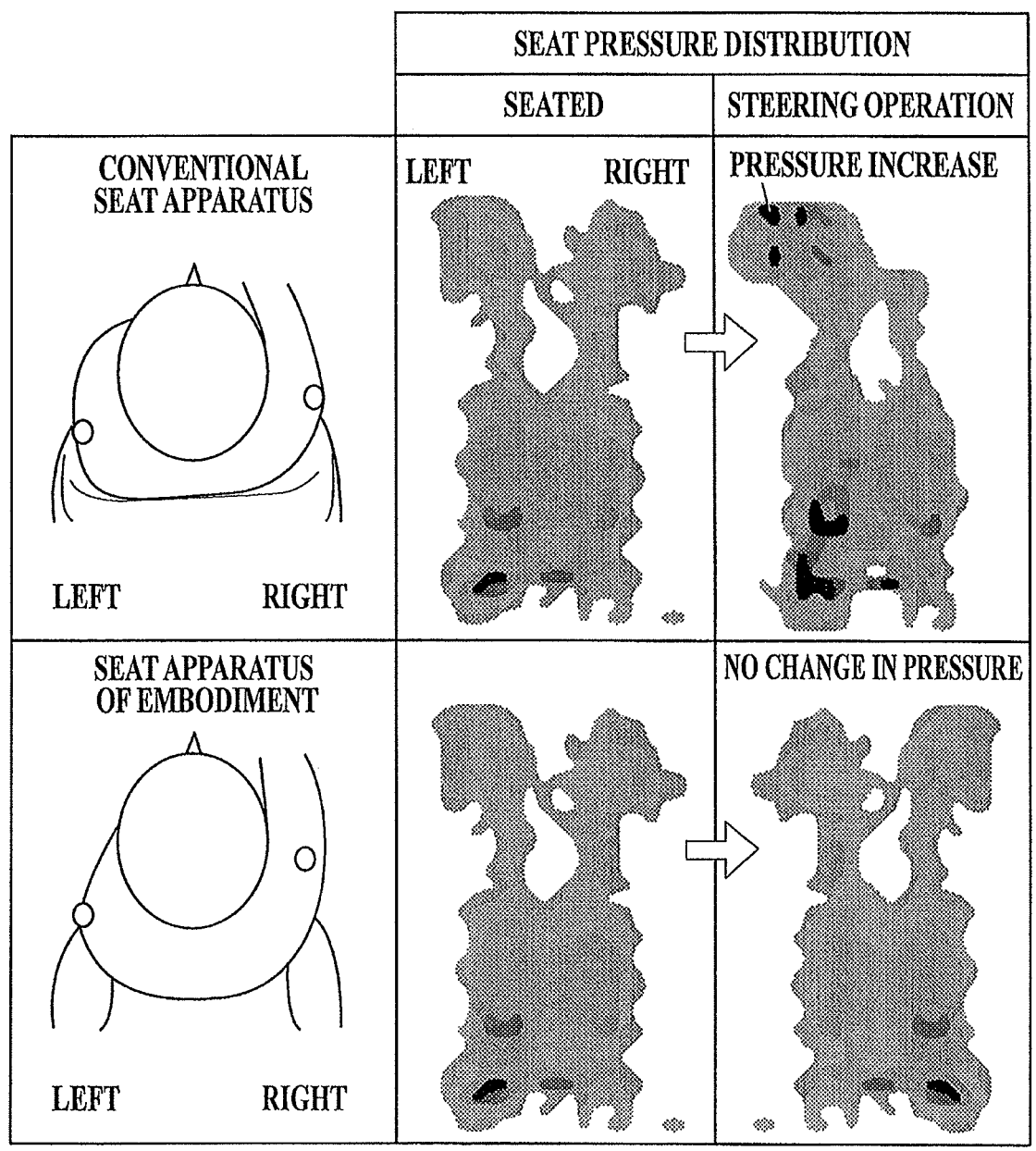
FIG. 8 is an explanatory drawing showing seat pressure distribution when a driver is seated and when a driver is operating a steering with respect to a case where the driver is held by side support frames as in a conventional seat apparatus and a case where the driver is held by the seat apparatus according to the embodiment.

FIG. 8 is an explanatory drawing showing seat pressure distribution when a driver is seated and when a driver is operating a steering operation with respect to a case where the driver is held by side support frames as in a conventional seat apparatus and a case where the driver is held by the seat apparatus according to the embodiment. In the seat pressure distribution shown in FIG. 8, the light color parts indicate parts where seat pressure is small and the dark color parts indicate parts where seat pressure is large. In a seated state, there is no great difference in seat pressure between the conventional seat apparatus and the seat apparatus 1 of the embodiment. However, it can be understood that the seat pressure increases at the shoulder parts in the conventional seat apparatus when operating the steering. In a case where the driver is held by the backboard 6 as in the seat apparatus 1 of the embodiment, pressure to the shoulder is small comparing to the case where the driver is held by moving the side support frames as in the conventional way. Therefore, operability of the steering operation can be enhanced while maintaining the driver holding ability at the time of cornering.

Further, the steering angle sensor 11 which detects the steering angle of the steering of a vehicle is used as the cornering sensor of the present invention. Therefore, the backboard 6 can be moved in conjunction with the steering operation.

Conventionally, among seat apparatuses to be mounted on vehicles such as auto mobiles, there is known a seat apparatus which holds the driver to the seat apparatus to reduce a burden on the driver by detecting measured lateral acceleration and holding the driver to the seat apparatus by moving the side support frames, which are provided with the seat apparatus, according to the detection result of the measured lateral acceleration in order to ensure safety in operation when the vehicle performs cornering (for example, see JP Hei4-031138).

Further, in recent years, it is preferred that the holding ability of the seat apparatus can vary according to the condition of the vehicle.

However, if measured lateral acceleration is to be used for controlling, the side support frames sensitively react to the detection result and may move frequently. Therefore, it is preferred that the holding ability of the seat apparatus can vary according to the state of the vehicle on the basis of the detected information alternative to the measured lateral acceleration.

In the embodiment, if the calculated lateral acceleration which is calculated from the detection result obtained by the steering angle sensor 11 and the detection result obtained by the vehicle speed sensor 12 is a predetermined value or greater, the swing mechanism 8 operates and the backboard 6 swings.

Figure 9:
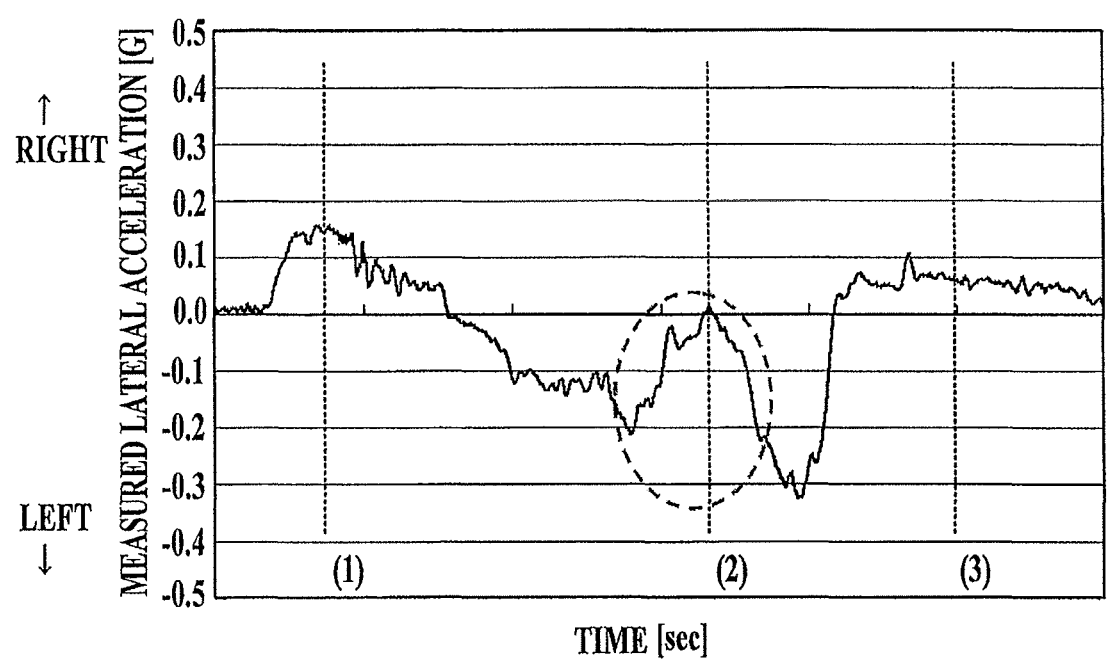
FIG. 9 is a graph showing change in measured lateral acceleration over time in a case where a vehicle travels the path same as that in the case of FIG. 7, the measured lateral acceleration being obtained by measuring the actual lateral acceleration to the vehicle on a real-time basis.

Here, FIG. 9 is a graph showing change in actual lateral acceleration over time in a case where a vehicle 1 travels the path same as that in the case of FIG. 7, the measured lateral acceleration being obtained by measuring the actual lateral acceleration to the vehicle on a real-time basis. Since the measured lateral acceleration is sensitive to the influence of steering correction, slipping on a road and the like, the measured lateral acceleration exceeds the threshold (−0.2 G) in the area circled with a dotted circle. In a case where the swing mechanism 8 is controlled on the basis of the detection result of the measured lateral acceleration, the backboard 6 moves frequently and a load is put on the driver. On the other hand, in a case of calculated lateral acceleration as shown in FIG. 7, the above mentioned influence can be controlled. Therefore, the swing mechanism 8 do not move frequently and the load put on the driver can also be reduced. In such way, even if calculated lateral acceleration is used alternative to measured lateral acceleration, the holding ability of the seat apparatus can vary according to the state of the vehicle.

The embodiment in which the present invention is applicable is not limited to the above described embodiment, and the embodiment can be modified arbitrarily within the scope of the invention.

For example, in the above described embodiment, the steering angle sensor 11 is described as an example of a cornering sensor which detects the cornering direction of a vehicle. However, the road information (for example, road condition and the like) obtained from a navigation system installed in a vehicle may be used as a cornering sensor. Further, since a sensor which detects the cornering direction of a vehicle is usually installed in a navigation system itself, the control unit 10 may recognize the cornering direction of the vehicle from the detection result obtained by such sensor. In such way, the backboard 6 can be moved in conjunction with the actual traveling rout.

Moreover, in the above described embodiment, a case where the two side parts of the backboard 6 are respectively swung in the front-back direction is described as an example. However, the control unit 10 may control at least one of the first drive source 82 and the second drive source 84 so that, among the two side parts of the backboard 6, the side part which is inside with respect to the cornering direction be positioned at back than the side part which is outside with respect to the cornering direction. Even in such case, the posture of the driver can be made to tilt inside with respect to the cornering direction, and the operability of the steering operation can be improved while maintaining the driver holding ability at the time of cornering.

Further, in the above described embodiment, a case where an adjustment mechanism for adjusting the posture of a driver includes the backboard 6 and the swing mechanism 8 is described as an example. However, the adjustment mechanism may be any mechanism as long as it adjusts the posture of a driver. For example, an adjustment mechanism which adjusts the posture of a driver by moving the side support frames which are respectively provided to the side frames which form a pair is suggested.

INDUSTRIAL APPLICABILITY

The seat apparatus according to the present invention can be applied to a seat apparatus to be mounted on a vehicle.

EXPLANATION OF REFERENCE NUMERALS 1 seat apparatus
2 seat cushion frame
3 seat back frame
4 seat rail
5 frame main body
6 backboard (adjustment mechanism)
7 connector
8 swing mechanism (adjustment mechanism)
10 control unit
11 steering angle sensor (cornering sensor)
12 vehicle speed sensor
51 side frame
52 side frame
53 upper frame
54 lower frame
81 first connection unit
82 first drive source
83 second connection unit
84 second drive source
100 vehicle
811 wire unit
812 gear unit
813 rotary shaft
814 link unit

The invention claimed is:

1. A seat apparatus to be mounted on a vehicle, comprising:
   a first seat frame that includes left and right side frames which are respectively arranged at left and right sides of the first seat frame so as to extend in a vertical direction which is vertical to a left-right direction; and
   a second seat frame,
   wherein
   the first seat frame further includes:
      a board which is arranged between the side frames;
      a wire which connects the board to the side frames; and
      a connector which is fixed at end parts of the side frames and which is connected to the second seat frame so as to rotate freely,
   a first opening and a second opening are formed on the board, the first opening being closer to the connector than the second opening,
   a width of the second opening in the left-right direction is larger than a width of the first opening in the left-right direction,
   a width of the board in the left-right direction is larger at a portion where the second opening is formed than at a portion where the first opening is formed,
   an outer edge of the second opening in the left-right direction is on the outer side of an outer edge of the first opening in the left-right direction, and
   an inner edge of the second opening in the left-right direction is on the inner side of an inner edge of the first opening in the left-right direction.

2. The seat apparatus according to claim 1, wherein the second opening comprises:
   a lateral slot that extends in the left-right direction; and
   a vertical slot that extends in the vertical direction from at least one of left and right ends of the lateral slot.

3. The seat apparatus according to claim 2, wherein the vertical slot extends from each of left and right ends of the lateral slot.

4. The seat apparatus according to claim 3, wherein the vertical slot extends from each of the left and right ends of the lateral slot in a direction opposite to the connector.

5. The seat apparatus according to claim 3, wherein the vertical slot extends from each of the left and right ends of the lateral slot in a direction toward the connector.

6. The seat apparatus according to claim 1, wherein the wire passes by the second opening on a side opposite to a driver across the board.

7. The seat apparatus according to claim 1, wherein the first opening and the second opening are aligned in the vertical direction.

8. The seat apparatus according to claim 6, wherein the second opening is a plurality of openings aligned in the left-right direction.

9. The seat apparatus according to claim 1, wherein
   the connector is fixed at lower end parts of the side frames,
   the first seat frame further includes an upper frame which extends between upper end parts of the side frames, the upper frame is provided with a head rest supporting unit for detachably supporting a head rest, and the board is shaped in a substantially rectangular shape when seen from front and is disposed between the side frames to support a back of a driver via a seat pad.

10. The seat apparatus according to claim 9, wherein the second seat frame is a seat cushion frame, and the first seat frame is a seat back frame which is arranged so as to stand from a back end part of the seat cushion frame.

11. The seat apparatus according to claim 1, wherein the first opening is a pair of first openings aligned in the left-right direction, and the second opening is a pair of second openings aligned in the left-right direction.

12. The seat apparatus according to claim 11, wherein a third opening is formed between the second openings on the board.

\* \* \* \* \*